United States Patent
Emery et al.

(10) Patent No.: US 7,460,293 B2
(45) Date of Patent: Dec. 2, 2008

(54) DISPLAY SYSTEM

(75) Inventors: Timothy R Emery, Corvallis, OR (US); George Radominski, Corvallis, OR (US); Steve P. Hanson, Albany, OR (US); Robert W. Shreeve, Pullman, WA (US); Alexander Govyadinov, Corvallis, OR (US); Martha A. Truninger, Corvallis, OR (US); Sriram Ramamoorthi, Corvallis, OR (US); Harold Lee Van Nice, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 260 days.

(21) Appl. No.: 11/239,865

(22) Filed: Sep. 30, 2005

(65) Prior Publication Data

US 2007/0076176 A1   Apr. 5, 2007

(51) Int. Cl.
*G02B 26/00* (2006.01)
*G09G 3/34* (2006.01)
*H04N 3/12* (2006.01)

(52) U.S. Cl. .................. 359/293; 359/290; 345/108; 348/740

(58) Field of Classification Search ......... 359/223–225, 359/290–293, 295, 316, 453, 455–456, 460, 359/846; 353/30–31; 345/108–109; 348/740, 348/770–772; 250/492.3, 492.22
See application file for complete search history.

(56) References Cited

U.S. PATENT DOCUMENTS

| | | | | |
|---|---|---|---|---|
| 3,667,830 A | * | 6/1972 | Rottmiller | 359/292 |
| 3,746,911 A | * | 7/1973 | Nathanson et al. | 348/771 |
| 4,403,248 A | * | 9/1983 | Te Velde | 348/755 |
| 5,768,009 A | * | 6/1998 | Little | 359/293 |
| 5,926,309 A | * | 7/1999 | Little | 359/293 |
| 6,034,810 A | * | 3/2000 | Robinson et al. | 359/293 |
| 6,903,355 B2 | | 6/2005 | Yasuda et al. | |

\* cited by examiner

*Primary Examiner*—Scott J Sugarman
*Assistant Examiner*—Dawayne A Pinkney

(57) ABSTRACT

One embodiment of a display system includes a first array that defines multiple reflective devices each movable between an inactive position to reflect light to a light dump and an active position to reflect light to an imaging region, a second array that defines multiple reflective devices each movable between an inactive position to reflect light to the light dump and an active position to reflect light to the imaging region, and an activation device that projects an activation beam to the devices to move individual ones of the devices between the active position and the inactive position, wherein the first array, the second array and the activation device are housed within a single vacuum enclosure.

30 Claims, 2 Drawing Sheets

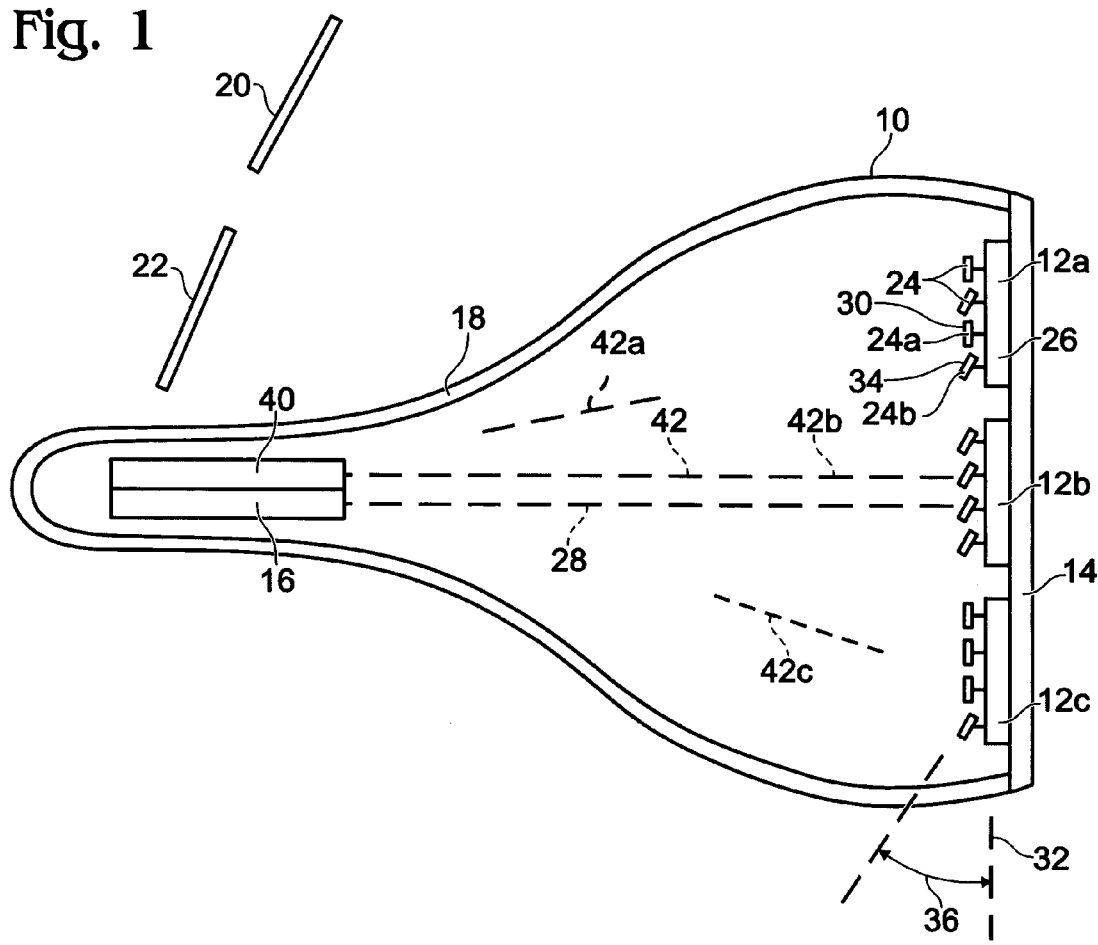
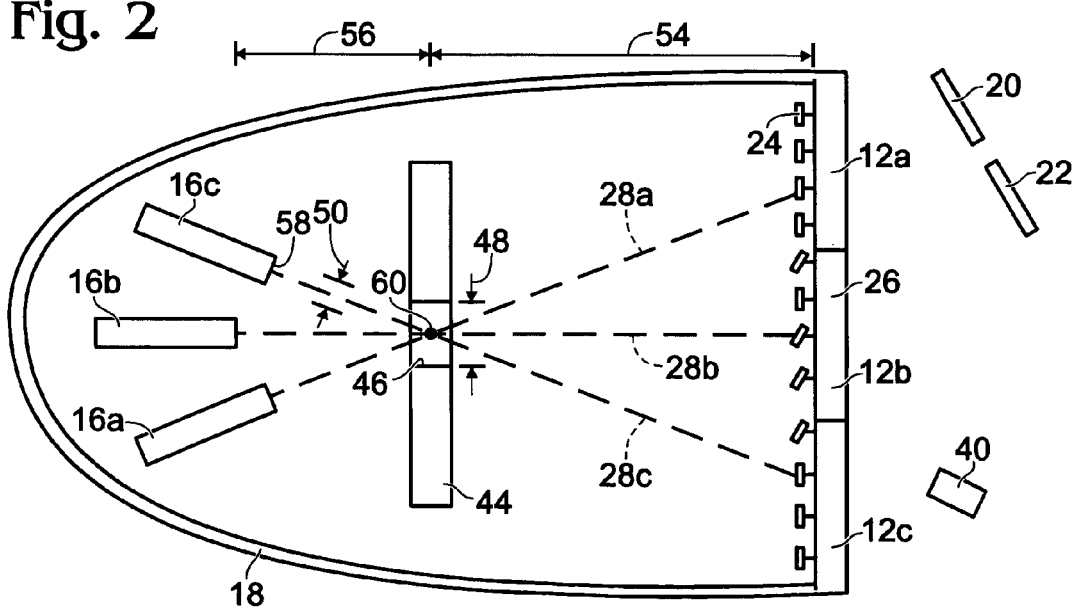

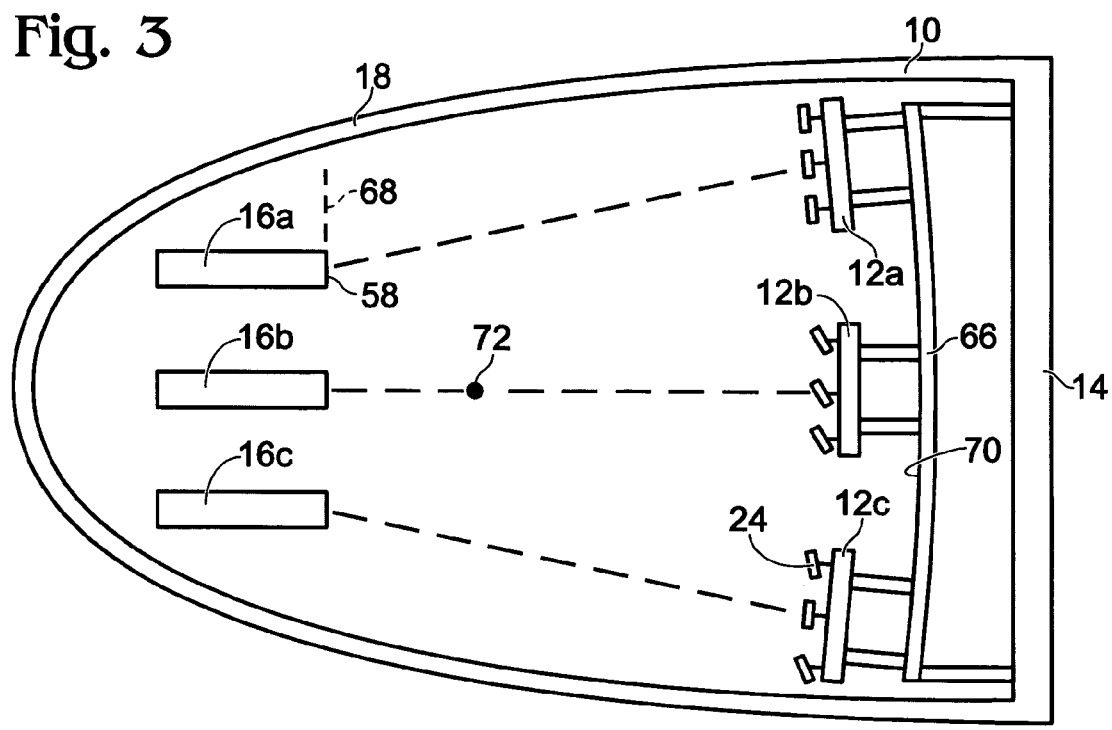

DISPLAY SYSTEM

BACKGROUND

Display systems, such as projection type devices, may include one or more optical modulators. The modulators may each include a plurality of reflective devices, such as movable micromirrors, wherein each micromirror may correspond to a pixel or a sub-pixel of the modulator. A display system may function by reflecting light from pixels or sub-pixels of the one or more modulators in accordance with the individual positions of the pixels or sub-pixels. The multiple modulators may be mechanically aligned with one another to converge the multiple modulated images into a single, final image. This mechanical alignment process may be time consuming and increase the cost of a multiple modulator system.

BRIEF DESCRIPTION OF THE DRAWINGS

FIG. 1 is a schematic cross-sectional side view of one embodiment of a display system including one embodiment of three micromirror arrays and one embodiment of an activation beam generator positioned inside one embodiment of a vacuum enclosure.

FIG. 2 is a schematic cross-sectional side view of one embodiment of a display system including one embodiment of three micromirror arrays, one embodiment of three activation beam generators, and one embodiment of a activation beam mask positioned inside one embodiment of a vacuum enclosure.

FIG. 3 is a schematic cross-sectional side view of one embodiment of a display system including one embodiment of three micromirror arrays mounted on a frame and one embodiment of three activation beam generators positioned inside one embodiment of a vacuum enclosure.

DETAILED DESCRIPTION OF THE DRAWINGS

This application hereby incorporates herein by reference U.S. application Ser. No. 10/743,603, filed on Dec. 21, 2003, and now issued as U.S. Pat. No. 6,943,933.

FIG. 1 is a schematic cross-sectional side view of one embodiment of a display system 10 including three micromirror arrays 12a, 12b and 12c, mounted on a substrate 14, and an activation device 16 housed within a housing 18. Mounting several arrays 12 inside housing 18 may fix the relative array positions with respect to each other, which may reduce alignment problems during operation of the display system. For example, in a multiple array system, such as when each array may be dedicated to a single color, precise alignment of the single color images may be beneficial in producing a clear, multi-color image. Accordingly, fixedly mounting each array within a single enclosure may remove the alignment parameter as a system variable, thereby simplifying the overall system. Moreover, mounting multiple arrays in a single enclosure may reduce the costs associated with manufacture of display system 10. The position of multiple arrays secured to a single substrate 14, as shown in FIG. 1, may be established by mechanical placement and bonding process tolerances. The position of multiple arrays fabricated on a single support base 26, as shown in FIG. 2, or fabricated on a single substrate 14, may be determined by photolithographic tolerances, such as a positional accuracy of one micron or less. The position of multiple arrays secured onto a machined frame, as shown in FIG. 3, may be established by an accuracy of a die saw position with respect to the array, array placement onto the frame, and frame machining tolerances.

Each of arrays 12 may be a microelectrical mechanical (MEMs) array that may be formed by lithographic and other usual MEMs fabrication processes. Housing 18 may define a single, airtight or vacuum enclosure that encloses arrays 12, and activation device 16. Display system 10 may be a television, a camera, a projector, a monitor, an electronic device display screen, or the like. Display system 10 may further comprise a viewing region 20 and a light dump 22. Each array 12 may include an exemplary set of movable micromirrors 24 movably mounted on a support base 26, which may in turn be mounted on substrate 14, such that each of the arrays are fixedly mounted in a single plane. Mirrors 24 may be adapted to move between a first or "off" position 24a and a second or "on" position 24b. In the embodiment shown, three micromirrors 24 are shown on each array 12 for ease of illustration. However, in other embodiments, an array of hundreds, thousands, or more, of movable mirrors 24 may be mounted on each base 26 of display system 10. While system 10 in the illustrated embodiment is an optical device, it will be understood by those skilled in the art that the invention is not limited to optical devices.

Support base 26 may be manufactured of any suitable material, and in the embodiment shown, may be manufactured of a silicon based material, such as glass. Mirrors 24 may be manufactured of any reflective material, and in one exemplary embodiment, may be manufactured of an aluminum coating formed on a movable, rigid plate, such as by deposition techniques.

Activation device 16 may be an electron beam generator that may generate an activation beam, such as an electron beam 28, directed toward support base 26 having mirrors 24 mounted thereon. Housing 18 may define a vacuum therein such that electron beam generator 16, electron beam 28 and movable mirrors 24 are all housed within a vacuum. In one embodiment, electron beam generator 16 may sweep beam 28 sequentially across each of mirrors 24 to control the position of the mirrors, such as controllably moving imaging mirrors 24 between first or inactive position 24a and second or active position 24b. In first position 24a, an imaging mirror may be positioned with its front reflective surface 30 positioned parallel to a plane 32. In second position 24b, a mirror may be positioned with its front reflective surface 34 positioned at an angle 36 with respect to plane 32, wherein angle 36 may be in a range of −90 to +90 degrees, for example. In other embodiments, the "off" position of mirrors 24 may be angled and the "on" position may be parallel with respect to plane 32, or both the "on" and the "off" positions may be angled with respect to plane 32.

Display device 10 may further include a light source 40 that may produce a light beam 42 directed toward movable mirrors 24 mounted on support base 26. Light source 40 may be positioned outside housing 18 but is shown inside housing 18 for ease of illustration. Light source 40 may generate light beam 42 having a wavelength in a range of 380 nm to 780 nm. However, any suitable type of light may be generated by an appropriate light source as may be utilized for a particular application. Moreover, in one embodiment, light source 40 may produce a first beam of light 42a, having a first wavelength and being directed toward first array 12a, a second beam of light 42b, having a second wavelength and being directed toward second array 12b, and a third beam of light 42c, having a third wavelength and being directed toward third array 12c. In still another embodiment, light source 40 may include two or more separate light generation devices that may each produce a light beam 42a, 42b, 42c, and the like, respectively, for example, having a unique wavelength. The use of two or more different wavelengths of light may allow each array to project a different color light, such as blue light, green light, red light, and white light, for example.

Still referring to FIG. 1, in operation of one exemplary embodiment, display device 10 may function as follows. Electron beam generator 16 may scan each array 12 with beam 28 to activate individual ones of movable mirrors 24 to the on/activated state 24b and other individual ones of movable mirrors 24 to the off/unactivated state 24a, such that the activated mirrors 24b may be angled at angle 36 with respect to plane 32, and such that the unactivated mirrors 24a may be positioned parallel to plane 32. Light beam 42a may be directed toward micromirror array 12a. A portion of light beam 42a that is directed toward activated mirrors 24b will be reflected by mirrors 24b toward imaging region 20 and a portion of light beam 42a that is directed toward unactivated mirrors 24a will be reflected by mirrors 24a toward light dump 22. The light received by imaging region 20 may form an image thereon that may be projected to or viewed directly by a viewer (not shown). The process may then be repeated again and again with different individual ones of micromirrors 24 being activated and/or deactivated such that different images are sequentially formed on imaging region 20 to produce a desired single or motion, color or black and white, picture image. During this repetitive process, undesirable light reflected by unactivated mirrors 24a may be reflected to light dump 22 such that the undesirable light is not reflected to imaging region 20 and is not viewed by a viewer.

This same process may then be conducted for array 12b and then for array 12c, and for any other number of arrays of display system 10. The process may then be repeated again and again to produce a full color still or moving image on imaging region 20. Accordingly, each of arrays 12a, 12b and 12c may reflect light to imaging region 20, wherein each array may produce a portion of an image viewed on imaging region 20. Due to the positioning of arrays 12 and activation device 16 within a single vacuum enclosure 18, system 10 may have reduced manufacturing costs and may have decreased complexity in operation when compared with prior art display devices.

FIG. 2 is a schematic side cross sectional view of one embodiment of a display system 10 including several micromirror arrays 12 and several activation devices 16, and an activation beam mask 44 positioned therebetween. Utilizing multiple activation devices within a single enclosure 18 may be used to address single or multiple devices, such as multiple electron beam activated MEMs arrays 12. Utilizing multiple activation devices may lower the data rate required of any one activation beam 28 if different activation beams write different array positions at the same time. For example, a single array that is activated by four independent activation devices 16, such as electron beam generators, may utilize a 240 MHz data rate to each electron gun, for a 240 fps and a one megapixel array. The scan speed for such an example embodiment may be 187.2 kHz horizontal and 240 Hz vertical. In another embodiment, utilizing multiple activation devices may allow different functions to be simultaneously conducted, such as simultaneous writing and erasing.

In this embodiment, three arrays 12a, 12b and 12c and three activation devices 16a, 16b and 16c are positioned within housing 18. Each of arrays 12a, 12b and 12c may include a plurality of imaging micromirrors 24 and may each be fixedly mounted on a surface of the vacuum enclosure, such that support base 26 may be a faceplate of vacuum enclosure 18. In such an embodiment, the side wall of housing 18 may be secured directly to support base 26 to define the vacuum enclosure of housing 18. Light source 40 and viewing region 20 are positioned outside and in front of housing 18 such that in this embodiment, support base 26 is manufactured of a transparent material.

Each of activation devices 16 may provide a different functionality. For example, activation device 16a may erase data stored on an array 12 and activation 16b may write data to an array 12. In another example, activation device 16a may activate a first portion of an array and activation device 16b may activate a second portion of the same array.

In operation, activation device 16a may activate each of mirrors 14 on array 12a, activation device 16b may activate each of mirrors 14 on array 12b, and activation device 16c may activate each of mirrors 14 on array 12c. Light source 40 may then project light to arrays 12a, 12b and 12c to illuminate the entirety of each of arrays 12a, 12b and 12c, so as to form a precise image on imaging region 20 (see FIG. 1).

Activation beam mask 44 may include an aperture 46 that may define a size, such as defined by a diameter 48 of aperture 46, for example, that may be smaller than a spot size, such as defined by a diameter 50 (diameter 50 is shown extending between the reference lines 50 and is understood to define a diameter of activation beam 28 which is shown schematically as a dash line), for example, of each of activation beams 28. Mask 44 may be positioned between arrays 12 and activation devices 16 such that each of activation beams 28a, 28b and 28c pass through aperture 46 on their way to arrays 12a, 12b and 12c, respectively. Accordingly, mask 44 may be utilized for defining a size of the activation beams 28a, 28b and 28c that are allowed to pass to each of arrays 12a, 12b and 12c, respectively. Moreover, mask 44 may be utilized for defining a directionality of each of beams 28a, 28b and 28c such that beam 28a is projected only to array 12a, beam 28b is projected only to array 12b, and beam 28c is projected only to array 12c, for example. In other words, the position of mask 44 may prevent a portion of activation beam 28a from impinging on any array other than array 12a. Accordingly, mask 44 may be manufactured of a material that does not allow an activation beam to pass therethrough, except through aperture 46. In another embodiment, for example, activation devices 16 may each be positioned relative to single aperture 46 of mask 44 such that activation beam 28a of activation device 16a may strike only a first portion of array 12a and such that activation beam 28b of activation device 16b may strike only a second portion of the same array 12a and such that activation beam 28c may strike only a third portion of array 12a.

Mask 44 may be manufactured of any material that may be utilized for a particular application and, for example, may be a solid material manufactured of a material chosen from the group including an insulator, a conductor, a semiconductor, an amorphous material, a crystalline material, and a polycrystalline material. In one embodiment, single aperture 46 of mask 44 may define a diameter 48 in a range of five to fifteen microns, such as approximately ten microns, and diameter 50 of each of activation beams 28 may be larger than approximately ten microns, and may also be larger than fifteen microns.

Mask 44 may be positioned a first distance 54 from arrays 12 and may be positioned a second distance 56 from an aperture 58 of activation devices 16. First distance 54 may be much smaller than second distance 56, and may define a ratio of more than one-to-five, and in particular, a ratio in a range of approximately one-to-five and up to one-to-one hundred. In one embodiment, first distance 54 may be in a range of approximately one to ten centimeters and second distance 56 may also be in a range of approximately one to ten centimeters. In the figures, first distance 54 is shown greater than second distance 56 for ease of illustration. In the embodiment shown, each aperture 58 of activation devices 16 may be positioned radially about a central point 60, that may be positioned within aperture 46 of mask 44. In such an embodiment, distance 56 from aperture 28 of each of activation devices 16 to aperture 46 of mask 44 may be the same distance for each of devices 16a, 16b and 16c.

FIG. 3 is a schematic cross-sectional side view of one embodiment of a display system 10 including one embodiment of three micromirror arrays 12a, 12b and 12c, fixedly mounted on a frame 66, which is secured to a surface of vacuum enclosure 18, namely, substrate 14 of housing 18. In this embodiment, three activation beam generators 16a, 16b and 16c are positioned inside vacuum enclosure 18, wherein an aperture 58 of each of the activation devices is positioned in a single plane 68. Frame 66 may comprise a rigid frame, such as made of a metal or the like, and which may define a curved front surface 70 such that arrays 12 are each fixedly mounted radially about a central point 72. Such positioning of arrays 12 may allow each of arrays 12 to be equally spaced from their corresponding activation beam generator 16 within housing 18, or equally spaced from an aperture 46 of a mask 44 (not shown) which may be positioned within housing 18.

The foregoing description of embodiments of the invention have been presented for purposes of illustration and description. It is not intended to be exhaustive or to limit the invention to the precise form disclosed, and modifications and variation are possible in light of the above teachings or may be acquired from practice of the invention. The embodiment was chosen and described in order to explain the principles of the invention and its practical application to enable one skilled in the art to utilize the invention in various embodiments and with various modification as are suited to the particular use contemplated. It is intended that the scope of the invention be defined by the claims appended hereto and their equivalents.

We claim:

1. A display system, comprising:
   a first array that defines multiple reflective devices each movable between an inactive position to reflect light to a light dump and an active position to reflect light to an imaging region;
   a second array that defines multiple reflective devices each movable between an inactive position to reflect light to said light dump and an active position to reflect light to said imaging region; and
   an activation device that projects an activation beam to said devices to move individual ones of said devices between said active position and said inactive position,
   wherein said first array, said second array and said activation device are housed within a single vacuum enclosure, and
   wherein said first array is dedicated to reflecting a first color and said second array is dedicated to reflecting a second color different from said first color.

2. The system of claim 1 wherein said first array and said second array are fixed mounted in a single plane.

3. The system of claim 1 wherein said first array and said second array are fixed mounted radially about a central point.

4. The system of claim 1 further comprising a third array, wherein said first, second, and third arrays are each dedicated to reflecting, respectively, a red color, a green color, and a blue color.

5. The system of claim 1 wherein said first array and said second array each comprise a MEMs array.

6. The system of claim 1 wherein said first array and said second array are each fixedly mounted on a surface of the vacuum enclosure.

7. The system of claim 1 wherein said first array and said second array are each fixedly mounted on a frame that is secured to a surface of the vacuum enclosure.

8. A display system, comprising:
   an array that defines multiple reflective devices each movable between an inactive position to reflect light to a light dump and an active position to reflect light to an imaging region;
   a first activation device that projects an activation beam to said devices to move individual ones of said devices between said active position and said inactive position, said first activation device dedicated to writing a first color; and
   a second activation device that projects an activation beam to said devices to move individual ones of said devices between said active position and said inactive position, said second activation device dedicated to writing a second color different from said first color,
   wherein said array, said first activation device and said second activation device are housed within a single vacuum enclosure.

9. The system of claim 8 wherein said first activation device erases data stored on said array and said second activation device writes data to said array.

10. The system of claim 8 wherein said first activation device activates a first portion of said array and said second activation device activates a second portion of said array.

11. The system of claim 8 further comprising a third activation device, wherein said first, second, and third activation devices are each dedicated to writing, respectively, a red color, a green color, and a blue color.

12. The system of claim 8 wherein said first and second activation devices each include an aperture positioned in a single plane.

13. The system of claim 8 wherein said first and second activation devices are positioned radially about a central point.

14. The system of claim 8 further comprising a mask positioned between said array and said first and second activation devices, said mask including a single aperture through which passes said activation beam of each of said first and second activation devices.

15. The system of claim 14 wherein said aperture of said mask defines a diameter smaller than a diameter of said activation beam of each of said first and second activation devices.

16. The system of claim 14 wherein said mask is positioned a distance from said activation devices and a distance from said array at a ratio of at least ten to one.

17. display system, comprising:
   an array that defines multiple reflective devices each movable between an inactive position to reflect light to a light dump and an active position to reflect light to an imaging region;
   an activation device that projects an activation beam to said devices to move individual ones of said devices between said active position and said inactive position; and
   a planar mask positioned between said array and said activation device, said planar mask including a single aperture through which passes said activation beam of said activation device.

18. The system of claim 17 wherein said mask includes an aperture sized smaller than a size of said activation beam of said activation device.

19. The system of claim 17 further comprising a second array that defines multiple reflective devices each movable between an inactive position to reflect light to said light dump and an active position to reflect light to said imaging region, a second activation device that projects a second activation beam to said devices to move individual ones of said devices between said active position and said inactive position, wherein said activation device projects its activation beam through said single aperture of said mask to said array and said second activation device projects its activation beam through said single aperture of said mask to said second array.

20. The system of claim 17 wherein said mask is manufactured of a solid material.

21. The system of claim 17 wherein said mask is manufactured of one of an insulator, a conductor, a semiconductor, an amorphous material, a crystalline material, and a poly-crystalline material.

22. The system of claim 17 wherein said single aperture of said mask defines a diameter in a range of five to fifteen microns.

23. The system of claim 17 further comprising a second activation device that projects a second activation beam to said devices to move individual ones of said devices between said active position and said inactive position, wherein said activation device and said second activation device are each positioned relative to said single aperture of said mask such that said activation beam of said activation device strikes only a first portion of said array and such that said second activation beam of said second activation device strikes only a second portion of said array.

24. A method of manufacturing a display system, comprising:

forming a plurality of micromirror arrays on a single substrate, one of said plurality of micromirror arrays dedicated to reflecting a first color and another of said plurality of said micromirror arrays dedicated to reflecting a second color different from said first color;

positioning an activation beam generator in a position to project an activation beam to said plurality of micromirror arrays; and enclosing said plurality of micromirror arrays and said activation beam generator in a single vacuum enclosure.

25. The method of claim 24 wherein said forming comprises manufacturing said plurality of micromirror arrays on a single substrate by lithographic processes.

26. The method of claim 24 wherein said forming comprises securing individual micromirror arrays on said single substrate.

27. The method of claim 24 further comprising securing a second activation beam generator within said single vacuum enclosure.

28. The method of claim 24 further comprising securing an activation beam mask within said single vacuum enclosure and between said plurality of micromirror arrays and said activation beam generator.

29. A display system, comprising:

multiple means for modulating light each movable between an active position and an inactive position, a first portion of said multiple means dedicated to reflecting a first color and a second portion of said multiple means, different from said first portion, dedicated to reflecting a second color different from said first color;

means for moving said means for modulating between said active and inactive positions, said means for moving generating an activation beam defining a spot size; and means for defining a size of said activation beam and being positioned between said multiple means for modulating and said means for moving, wherein said means for defining includes an aperture smaller than said spot size.

30. The system of claim 29 further comprising a single airtight enclosure that encloses said multiple means for modulating, said means for moving and said means for defining.

* * * * *

UNITED STATES PATENT AND TRADEMARK OFFICE
CERTIFICATE OF CORRECTION

PATENT NO. : 7,460,293 B2
APPLICATION NO. : 11/239865
DATED : December 2, 2008
INVENTOR(S) : Timothy R Emery et al.

Page 1 of 1

It is certified that error appears in the above-identified patent and that said Letters Patent is hereby corrected as shown below:

On the Title Page, Item (75), in "Inventors", in line 4,
delete "Pullman, WA" and insert -- Moscow ID --, therefor.

In column 6, line 50, in Claim 17, before "display" insert -- A --.

Signed and Sealed this

Twenty-first Day of April, 2009

JOHN DOLL
*Acting Director of the United States Patent and Trademark Office*